(12) United States Patent
Abbas et al.

(10) Patent No.: US 9,821,808 B1
(45) Date of Patent: Nov. 21, 2017

(54) AUTONOMOUS BOAT LAUNCHING

(71) Applicant: Ford Global Technologies, LLC, Dearborn, MI (US)

(72) Inventors: Samer Abbas, Dearborn, MI (US); John P. Joyce, West Bloomfield, MI (US)

(73) Assignee: Ford Global Technologies, LLC, Deaborn, MI (US)

( * ) Notice: Subject to any disclaimer, the term of this patent is extended or adjusted under 35 U.S.C. 154(b) by 0 days.

(21) Appl. No.: 15/225,885

(22) Filed: Aug. 2, 2016

(51) Int. Cl.
| | | |
|---|---|---|
| *B60W 30/18* | (2012.01) | |
| *B60W 10/18* | (2012.01) | |
| *B62D 13/06* | (2006.01) | |
| *G01C 21/34* | (2006.01) | |
| *G01C 21/36* | (2006.01) | |
| *B60P 3/10* | (2006.01) | |

(52) U.S. Cl.
CPC ...... *B60W 30/18109* (2013.01); *B60W 10/18* (2013.01); *B60W 30/18036* (2013.01); *B62D 13/06* (2013.01); *G01C 21/3461* (2013.01); *G01C 21/365* (2013.01); *B60P 3/10* (2013.01); *B60W 2540/00* (2013.01)

(58) Field of Classification Search
CPC . B60W 30/18109; B60W 10/18; B62D 13/06; G01C 21/3461
See application file for complete search history.

(56) References Cited

U.S. PATENT DOCUMENTS

| | | | |
|---|---|---|---|
| 3,568,624 A | 3/1971 | Bjorklund | |
| 5,228,713 A | 7/1993 | Kovach | |
| 7,053,780 B1 | 5/2006 | Straub et al. | |
| 8,133,000 B2 | 3/2012 | Olson et al. | |
| 2010/0111660 A1 | 5/2010 | Mathews | |

*Primary Examiner* — Basil T Jos
(74) *Attorney, Agent, or Firm* — Frank A. MacKenzie; Bejin Bieneman PLC

(57) ABSTRACT

A computing device for a vehicle includes a processor and a memory. The processor is programmed to determine that a vehicle destination includes a boat launch and that the vehicle is towing a trailer including a boat. The computing device guides the vehicle at the boat launch to position the trailer to launch the boat.

20 Claims, 5 Drawing Sheets

AUTONOMOUS BOAT LAUNCHING

BACKGROUND

Boat owners may use autonomous vehicles to launch boats in the future. Launching a boat, e.g., navigating near and/or on a boat launch site, presents problems for operation of an autonomous vehicle that may not exist when the autonomous vehicle is navigating a roadway exclusively on land.

BRIEF DESCRIPTION OF THE DRAWINGS

FIG. 2B is a diagram of a second view of the exemplary graphical user interface of FIG. 2a.

DESCRIPTION

Introduction

Figure 1:
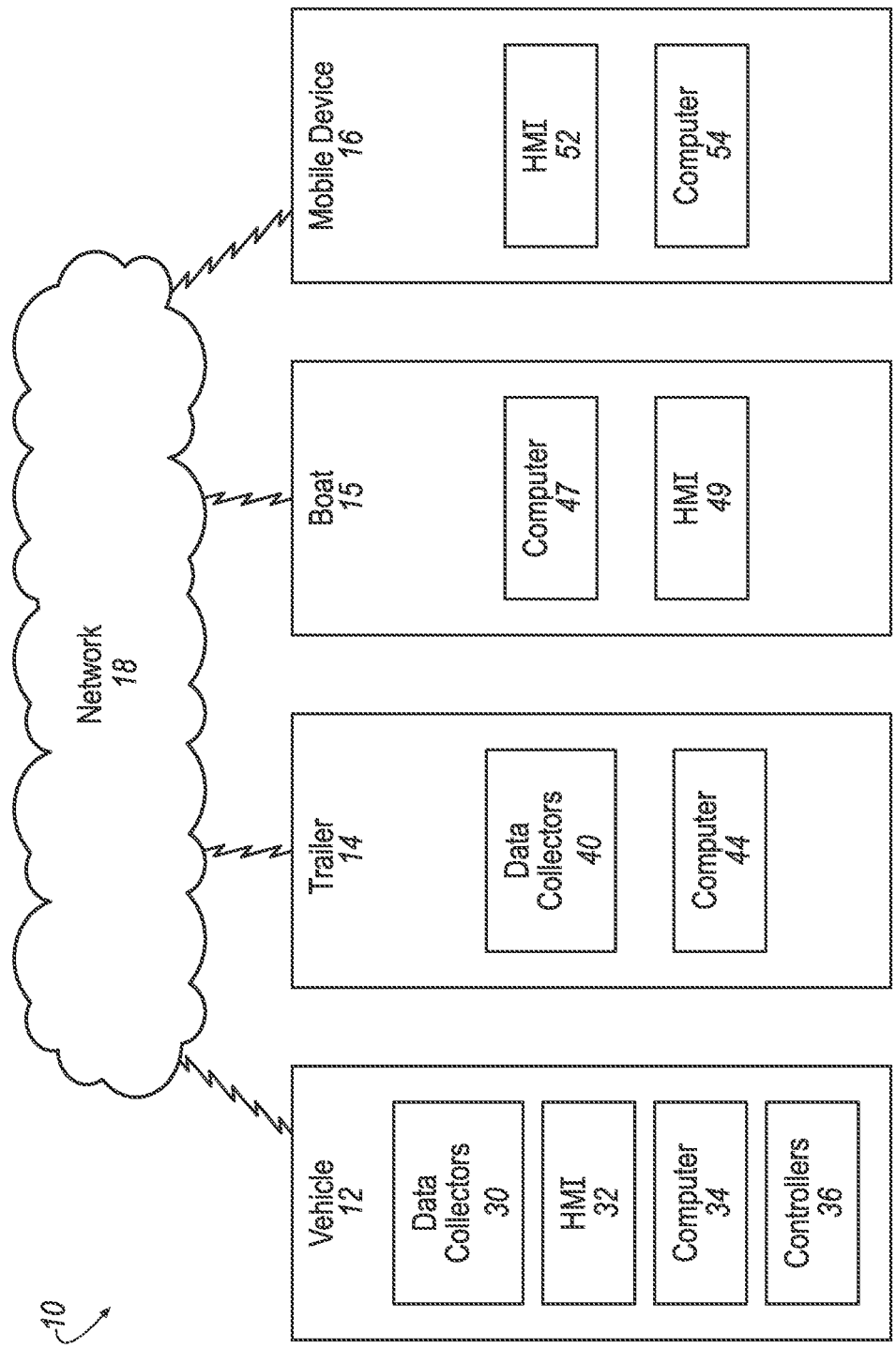
FIG. 1 is a block diagram of an exemplary system for controlling an autonomous vehicle.

A system 10 for operating an autonomous or semi-autonomous vehicle 12, including for autonomous launching and loading of a boat at by the vehicle 12, is shown in FIG. 1. The system 10 includes a vehicle 12, a trailer 14, a boat 15, and may further include a mobile device 16. The vehicle 12, trailer 14, and mobile device 16 are communicatively coupled via a network 18. Additionally, the boat 15 may be communicatively coupled with the vehicle 12, trailer 14 and mobile device 16.

Figure 2A:
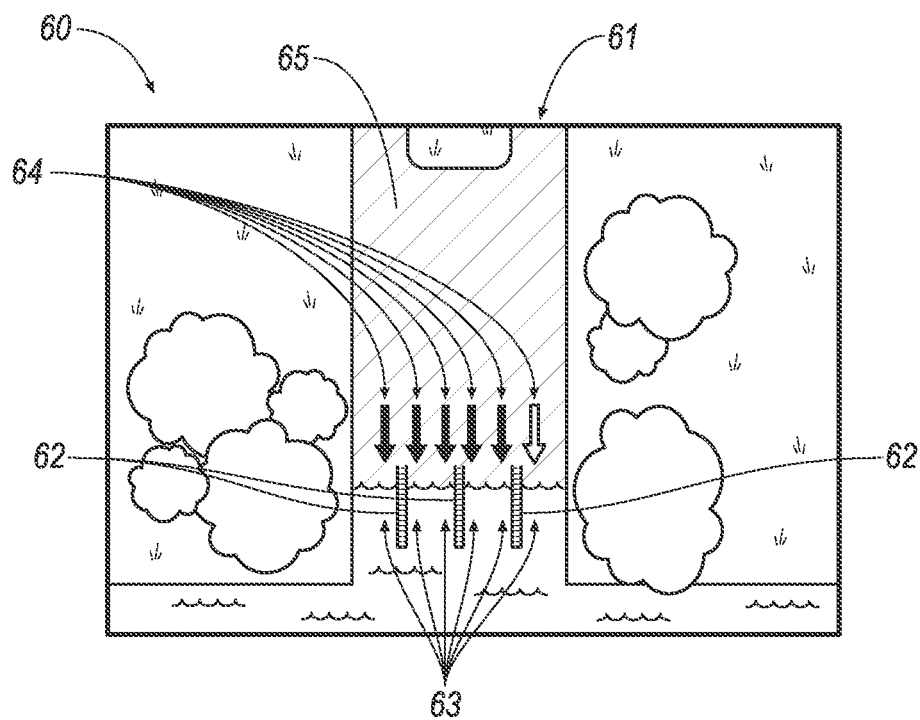
FIG. 2A is a diagram of an exemplary graphical user interface to receive input of a boat launch location.
Figure 2B:
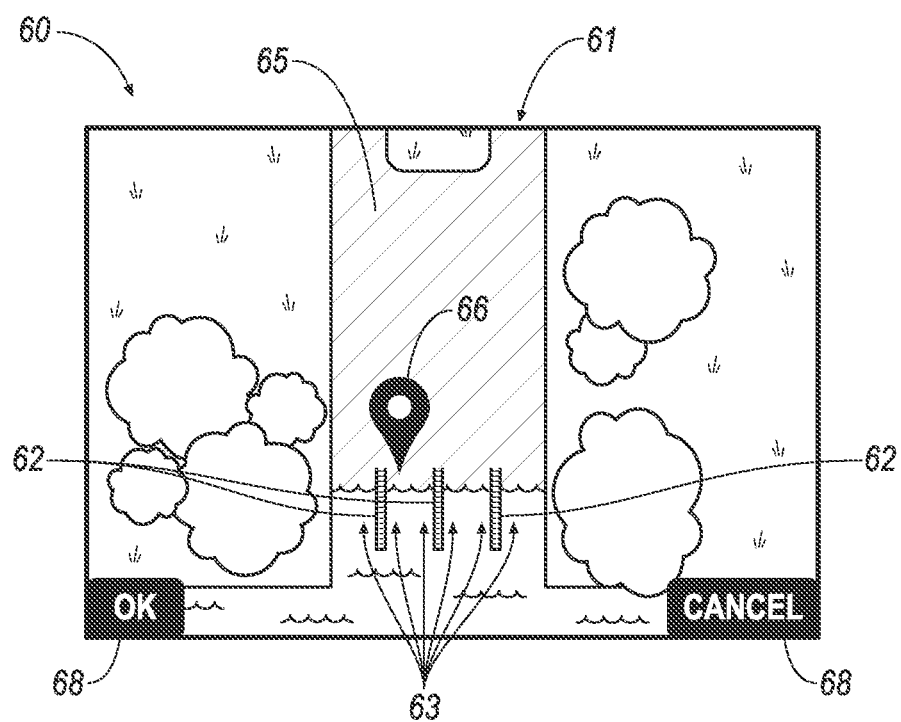

The vehicle 12 may be an autonomous or semi-autonomous vehicle, and includes a computer 34. The computer 34 is generally programmed to control the vehicle 12, and also to provide communication ascribed herein to the vehicle 12 via the network 18. The computer 34 receives destination information for the vehicle 12, determines a travel path for the vehicle 12 based on the destination information, and generates instructions to drive the vehicle 12 along the travel path using autonomous vehicle control techniques such as are known. Additionally, in the case that the destination includes a boat launch, the computer 34 determines whether the vehicle 12 is coupled to a trailer 14 and further determines whether the trailer 14 is carrying a boat 15. In the case that the destination includes a boat launch and the vehicle 12 is coupled to the trailer 14 carrying a boat 15, the computer 34 presents, via, e.g., a human-machine interface (HMI) 32 in the vehicle 12, a boat launch interface 60 (FIGS. 2A, 2B). The boat launch interface 60 may be a graphical user interface (GUI) 60 and may include a representation of the boat launch 61. A destination may be determined to include a boat launch 61, in the case, for example, that the boat launch 61 is part of the destination, such as when the destination is a park and the park includes the boat launch 61. The destination may be further determined to include a boat launch when, for example, the destination address is within a predefined distance, such as 0.5 miles from the boat launch, or when, based on maps associated with a navigation system, the boat launch 61 is within a predefined area that also includes the destination or destination address.

The vehicle 12 computer 34 is further programmed to receive input, via the boat launch interface 60, selecting a launch location 63 included in the boat launch 61 to launch the boat 15. The launch location 63 may be, for example, on a side of a particular dock 62, or another docking point within the boat launch 61.

As described in additional detail below, based on the identity of the boat launch 61, and/or the selected launch location 63, the vehicle 12 may perform various operations associated with launching the boat 15 including parking in an area near to the boat launch 61 or launch location 63, backing the trailer 14 into the launch location 63, parking the vehicle 12, based on input from a user, after the boat 15 is launched, returning to the launch location 63, or another launch location 63, to load the boat 15, etc.

System Elements

The vehicle 12 is generally a land-based autonomous vehicle 12 having three or more wheels, e.g., a passenger car, light truck, etc. The vehicle 12 includes one or more data collectors 30, the HMI 32, the computer 34 and one or more controllers 36. The data collectors 30, HMI 32 and controllers 36 are communicatively coupled to the computer 34.

The data collectors 30 may be programmed to collect data related to the vehicle 12 and the environment in which the first vehicle 12 is operating. By way of example, and not limitation, data collectors 30 may include e.g., altimeters, cameras, LiDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The data collectors 30 may be used to sense the environment in which the vehicle 12 is operating such as weather conditions, the grade of a road, the location of a road, neighboring vehicles 12, etc. The data collectors 30 may further be used to collect dynamic vehicle 12 data related to operations of the vehicle 12 such velocity, yaw rate, steering angle, engine speed, brake pressure, oil pressure, the power level applied to controllers 36 in the vehicle 12, connectivity between components, etc.

One or more of the data collectors 30 may be used to determine whether the vehicle 12 is coupled with the trailer 14 and whether the trailer 14 is carrying the boat 15. For example, a camera data collector 30 may collect images in an area behind the vehicle 12. Based on the images, the computer 34 may determine that the vehicle 12 is coupled to the trailer 14 and further that the trailer 14 is carrying the boat 15. As another example, a data collector 30 such as an electrical contact, an electromagnetic sensor, or a mechanical switch may detect a physical coupling between a trailer hitch associated with the vehicle 12 and a trailer hitch ball associated with the trailer 14. Further, one or more vehicle data collectors 30 and/or one or more trailer data collectors 40 may detect that the trailer 14 is carrying the boat. The vehicle 12 data collectors 30 and trailer 14 data collectors 40 may provide data to the vehicle 12 computer 34 indicating the presence of the trailer 14 and the boat 15.

The human machine interface (HMI) 32 is communicatively coupled to the computer 34 in a known manner such as described above and includes one or more output devices such as a display, lamps, speakers, etc., for communicating data to a user. The HMI 34 further includes one or more input devices such as a touch screen display, buttons, a mouse, a keyboard, a microphone, a gesture recognition device, switches, etc., for receiving input from the user.

The HMI 32 may be used to receive inputs from the user to select a destination for the vehicle 12. The HMI 32 may further be used to receive input from the user to select a launch location 63 within the boat launch 61 for launching the boat 15. For example, the computer 34 may display, via the HMI 32, a graphical user interface (GUI) including a representation of a boat launch 61 at the destination for the vehicle 12. The representation of the boat launch 61 may include an input field for receiving a selection for a launch location 63 for the user to launch the boat 15. The input field may be, for example, a touch screen displaying arrows which may be selected by a tap on the touch screen, pins which may be dragged by a dragging action on the touch screen, buttons which may be activated by a tap on the touch screen at the location of the button, etc.

The computer 34 includes a processor and a memory. The memory includes one or more types of computer-readable media, and storing instructions executable by the processor for performing various operations, including as disclosed herein. Further, the computer 34 may include and/or be communicatively coupled to one or more other computers, including e.g., vehicle components such as the data collectors 30, the HMI 32 and the controllers 36, which likewise as is known may include respective processors and memories. Communications may be performed, e.g., via a controller area network (CAN) bus or local interconnect network (LIN) bus, a wired and/or wireless in-vehicle local area network (LAN), e.g., using wired or wireless technologies such as Wi-Fi®, Bluetooth®, etc., as is known.

The one or more controllers 36 in the vehicle 12 control respective vehicle 12 subsystems and may include known electronic control units (ECUs) or the like including, as non-limiting examples, one or more engine controllers, one or more brake controllers, one or more power steering controllers, etc. Each of the controllers 36 may include respective processors and memories and one or more actuators. The controllers 36 may be programmed and connected to a vehicle 12 communications bus, such as a controller area network (CAN) bus or local interconnect network (LIN) bus, to receive instructions from the computer 22 and control actuators based on the instructions.

The trailer 14 may be a standard boat trailer as is known. The boat trailer includes a physical coupling device (e.g., a trailer hitch ball) for connecting the trailer 14 to the vehicle 12. The trailer 14 may further include data collectors 40 and a computer 44.

The data collectors 40 may be communicatively coupled to the computer 44. The data collectors 40 may collect data for the trailer computer 44 and/or the vehicle computer 34 and may include cameras, LiDAR, radar, ultrasonic sensors, etc. as described with regard to data collectors 30.

The data collectors 40 may collect data indicating that the trailer 14 is carrying the boat 15. The data collectors 40 may further collect data indicating that a portion of the trailer 14 is immersed in water up to a level sufficient to launch the boat 15. For example, a data collector 40 mounted on a portion of the trailer 14 may detect with the data collector 40 is immersed in (or in contact with) water. As another example, while backing the trailer 14 into water, a radar or LiDAR system may monitor the water at a location at a rear of the trailer 14, and measure the water depth.

The system 10 may include the boat 15. The boat 15 may be any type of vessel that can be launched from a launch location 63. In some cases, the boat 15 may include a computer 47 and/or a human-machine interface (HMI) 49. The computer 47 may be communicatively coupled with the HMI 49, and may further be communicatively coupled with one or more of the vehicle 12, the trailer 14 and the mobile device 16.

In some cases, for example when the boat 15 is returning to a launch location 63, the boat 15 computer 47 may exchange data and instructions with the vehicle 12 computer 34 to initiate a pick-up of the boat 15. The user may, via the boat 15 HMI 49, activate a process for picking up the boat 15. The HMI 49 may display a graphical interface such as the graphical interface 60. The user may, via the graphical interface 60, select a launch location 63. The computer 34, based on the selected launch location 63, may direct the vehicle 12 to back the trailer 14 into the selected launch location 63, to facilitate loading the boat 15.

The system 10 may include a mobile device 16. The mobile device 16 may be, for example, a mobile telephone, a tablet, a personal computer, a smart wearable, etc. The mobile device 16 is communicatively coupled with the vehicle 12 computer 34 and includes a human-machine interface (HMI) 52 and a computer 54.

The HMI 52 is communicatively coupled to the computer 54 in a known manner. As described with regard to the vehicle 12 HMI 32 and boat HMI 49, the HMI 52 may display graphical interfaces such as the GUI 60, to facilitate, for example, selecting a launch location 63 to pick up the boat 15.

The computer 54 includes a processor and a memory. The memory includes one or more types of computer-readable media, and storing instructions executable by the processor for performing various operations, including as disclosed herein.

As described with regard to the boat 15 computer 47 and boat 15 HMI 19, the mobile device 16 computer 54 and mobile device 16 HMI 52 may be used, for example, to send a request to the vehicle 12 computer 34 to pick up the boat 15. The HMI 52 may display a graphical interface 60 that allows the user to select a launch location 63, and transmit the launch location 63 to the vehicle 12 computer 34.

The network 18 represents one or more mechanisms by which the one or more vehicles 12, the trailer 14 and the mobile device 16 may communicate with each other, and may be one or more of various wired or wireless communication mechanisms, including any desired combination of wired (e.g., cable and fiber) and/or wireless (e.g., cellular, wireless, satellite, microwave and radio frequency) communication mechanisms and any desired network topology (or topologies when multiple communication mechanisms are utilized). Exemplary communication networks include wireless communication networks (e.g., using one or more of cellular, Bluetooth, IEEE 802.11, etc.), local area networks (LAN) and/or wide area networks (WAN), including the Internet, providing data communication services.

The types of wireless communications may include one or more of cellular, Bluetooth, IEEE 802.11 (typically, Wi-Fi), dedicated short range communications (DSRC), two-way satellite (e.g., emergency services), one way satellite (e.g., receiving digital audio radio broadcasts), AM/FM radio, etc.

FIG. 2A shows a graphical user interface (GUI) 60. The GUI 60 includes a boat launch 61 including docks 62. The boat launch 61 includes one or more launch locations 63. The launch locations 63 may be, for example, on each side of each of the docks 62.

The boat launch 61 may further include one or more preparation areas 65. The preparation areas are areas where the vehicle 12, together with the trailer 14, can park. The area may be used, e.g., to prepare the boat 15 prior to boating, close up the boat after boating, and for parking by the vehicle 12 while waiting for the boat 15 to return to the boat launch 61.

The GUI 60 may be used, for example, to select one or more launch locations 63 which may be used for launching the boat 15. The GUI 60 may include, for example, one or more arrows 64. The user may select, by tapping, launch locations 63 which may be used to launch the boat 15. The arrows 64 may change from a first color, for example red, to a second color, for example green, when selected by the user. The arrows 64 may switch back from green to red, for example, upon being tapped for a second time by the user.

FIG. 2B shows another view of exemplary graphical user interface (GUI) 60. As shown in FIG. 2B, the GUI 60 includes the boat launch 61, the docks 62 and the launch locations 63. GUI 60 includes a pin 66. The user may use the GUI 60 to select a particular launch location 63 to launch or load the boat 15. For example, the user may drag the pin 66 to a position to indicate the desired launch location 63.

As shown in FIG. 2B, the GUI 60 may further include buttons such as a an "OK" button to accept a selected launch location 63, or a "Cancel" button, to cancel the launch location 63 selection.

The GUI 60 may be displayed on one or more of the vehicle 12 HMI 32, the boat 15 HMI 49, and the mobile device 16 HMI 52, in response, for example, to a user request from the respective device, or based on an instruction from one of the vehicle 12 computer 34, the trailer computer 44, the boat computer 47 and the mobile device computer 54. The GUI 60 may further receive input from the user, and send instructions to the one or more of the of the vehicle 12 computer 34, the trailer computer 44, the boat computer 47 and the mobile device computer 54 based on the input.

Exemplary Process Flows

Figure 3A:
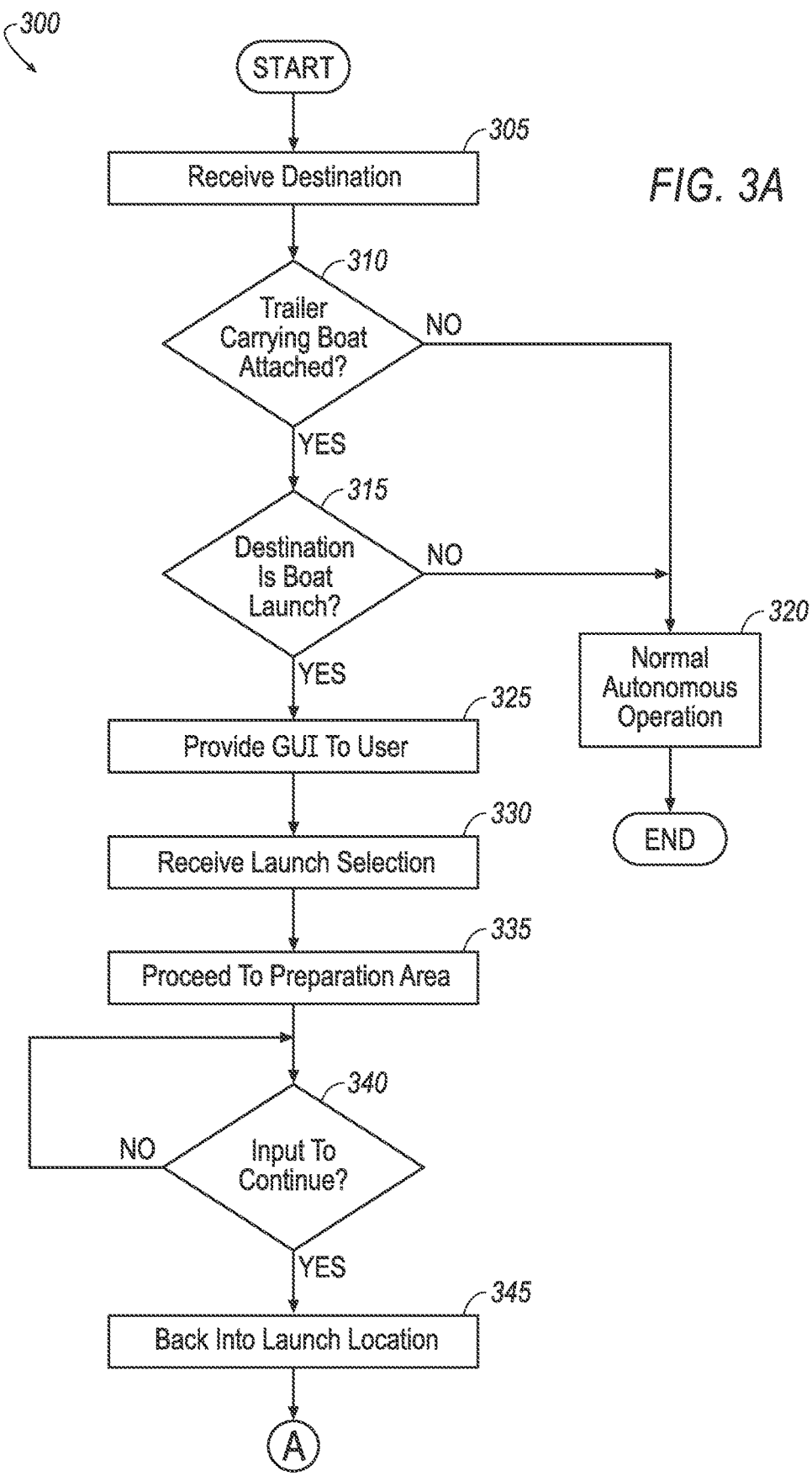
FIG. 3A is a diagram of a first portion of an exemplary process for operating an autonomous vehicle to launch a boat.
Figure 3B:
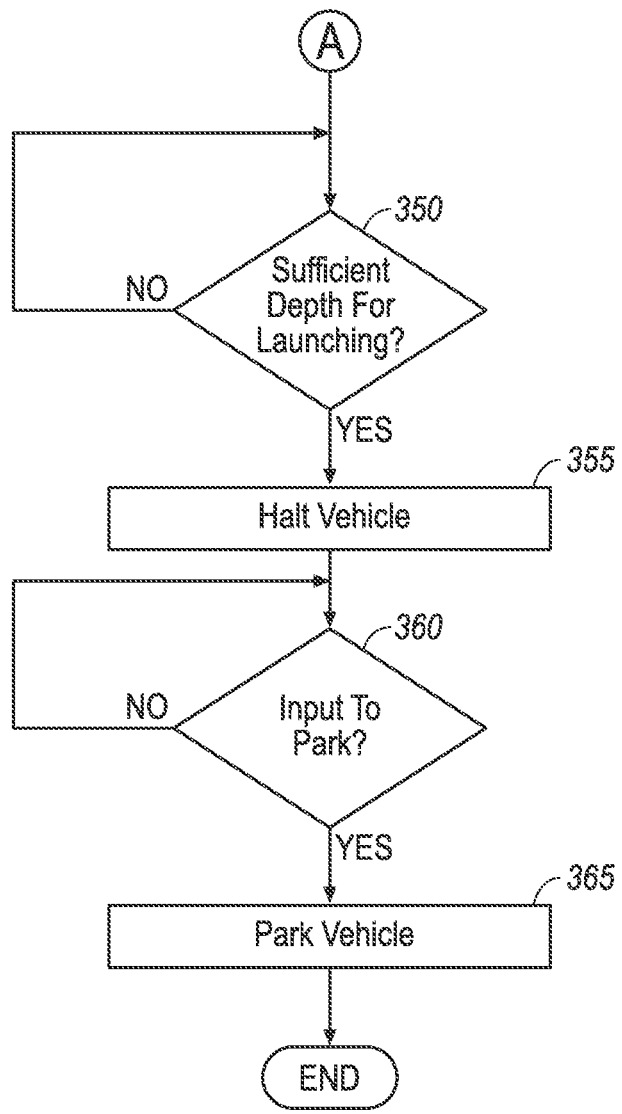
FIG. 3B is a diagram of a second portion of the exemplary process of FIG. 3A.

FIGS. 3A and 3B are diagrams respectively for first and second portions of an exemplary process 300 for launching a boat 15 by a vehicle 12. The process 300 starts in a block 305.

In the block 305, the vehicle 12 computer 34 receives a destination for the vehicle 12. For example, the user of the vehicle 12 may input destination via the HMI 32 of the vehicle 12. Upon receiving the destination, the process 300 continues in a block 310.

In the block 310, the vehicle 12 computer 34 determines whether the vehicle 12 is towing a trailer 14 that is carrying a boat 15. In order to make the determination, the computer 34 may collect data from one or more data collectors 30, 40. The data collectors 30, 40 may be associated with either or both of the vehicle 12 and the trailer 14.

For example, the computer 34 may collect image data from a camera 30 associated with the vehicle 12. The camera 30 may collect image data from a rear of the vehicle 12. Based on the image data, using known image recognition techniques, the computer 34 may determine that the vehicle 12 is towing the trailer 14 and further that the trailer 14 is carrying the boat 15.

As another example, data collectors 40 such as pressure switches 40, electromagnetic detectors 40, contact switches 40, infrared proximity detectors 40, etc. on the trailer 14 may detect the presence of the boat 15. The trailer computer 44 may provide data to the vehicle computer 34 indicating that the trailer is carrying the boat 15.

As another example, data collectors 30 or data collectors 40 may detect a physical coupling between a hitch ball or other physical coupling mechanism on the trailer 14 and a trailer hitch or other physical coupling mechanism on the vehicle 12. The data collectors 30, 40 may provide data to the computer 34 indicating that the vehicle 12 is coupled to the trailer 14.

As yet another example, a cable connecting electrical equipment (tail lights, blinkers, etc.) of the trailer 14 to the vehicle 12 may activate a data collector 30, 40 indicating that the cable connection has been formed.

In the case that the computer 34 determines that the vehicle 12 is towing a trailer 14 with a boat 15, the process 300 continues in a block 315. In the case that the computer 34 determines that the vehicle 12 is not towing a trailer 14 with a boat 15, the process 300 continues in a block 320.

In the block 315, the vehicle 12 computer 34 determines whether the destination is proximate to, or includes a boat launch 61. For example, the destination may be an address that is within a predetermined distance of a boat launch 61. The predetermined distance may be e.g., a fixed distance of 0.5 miles. As another example, the destination may be an area, such as a park, beach or property that is known to include and/or be associated with a boat launch 61.

Still further, navigation programs may define areas around boat launches 61. In the case that a destination address is located within the defined area, the computer 34 may determine that the destination is proximate to or includes the boat launch 61.

In the case that the computer 34 determines that the destination is proximate to or includes the boat launch 61, the process 300 continues in a block 325. Otherwise, the process 300 continues in a block 320.

In the block 320, the vehicle 12 is either not towing a trailer 14 with a boat 15, or not going to a destination that includes a boat launch 61. The computer 34 continues with normal autonomous operation of the vehicle 12, and the process 300 ends.

In the block 325, which may follow the block 315, the process 300 provides a graphical user interface (GUI) 60 to the user. The GUI 60 may be, for example, a GUI 60 such as the GUI 60 shown in FIGS. 2A and 2B. The GUI 60 may be presented to the user via one or more of the vehicle HMI 32, the boat 15 HMI 49 and the mobile device 16 HMI 52. The determination of where to present the GUI 60 may be based, for example, on current operating conditions of the vehicle 12, trailer 14, boat 15 and mobile device 16.

In the case, for example, that the user is driving the vehicle 12, and/or has input the destination to the vehicle 12 computer 34 via the vehicle 12 HMI 32, the computer 34 may transmit the GUI 60 to the vehicle 12 HMI 32. In the case that the vehicle 12 is parked, and the user has sent the destination to the vehicle 12 computer 34 via the boat 15 HMI 49, the mobile device 16 HMI 52 or another computing device, the computer 34 may reply to the computing device (and associated HMI) from which it received the destination. Upon presenting the GUI 60 via one of the HMIs 32, 49, 52 as described above, the process 300 continues in a block 330.

In the block 330 the computer 34 receives a launch location selection from the user via the GUI 60. For example, in the case of the GUI 60 (FIG. 2B), the user may drag the pin 66 to indicate a particular launch location 63 where the user would like to launch the boat 15. Upon receiving a launch location selection from the user, the process 300 continues in a block 335.

In the block 335, the computer 34 determines a boat preparation area 65 for preparing the boat 15, and guides the vehicle 12 to the preparation area 65. For example, the computer 34 may determine that there is a preparation area 65 included in or adjacent to the boat launch 61. In the case that the boat launch 61 is a large area, the computer 34 may further identify a location within the preparation area 65 that is proximate to a selected launch location 63. Proximate to the selected launch location 63 may be defined, e.g., as within a fixed distance such as 200 meters of the launch location 63.

In some cases, there may be more than one boat preparation area 65 proximate to the boat launch 61. Proximate to the boat launch in this case may mean, for example, within 500 meters of the boat launch 61 or included in the boat launch 61. In this case, the computer 34 may, via a GUI 60, present a map showing the different available boat preparation areas 65. The user may use the GUI 60 to select a boat preparation area 65 that the user prefers.

Upon determining the boat preparation area 65, the computer 34 guides the vehicle 12 to the boat preparation area 65, and parks the vehicle 12 together with the trailer 14, using known autonomous vehicle control techniques. Upon parking the vehicle 12 together with the trailer 14 in the boat preparation area, the process 300 continues in a block 340.

In the block 340, the vehicle 12 computer 34 receives an input to continue to the launch location 63. For example, the computer 34 may receive an input from the user indicating that the user is ready to launch the boat 15. The computer 34 may receive the input via one of the vehicle 12 HMI 32, the boat 15 HMI 49, and the mobile device 16 HMI 52. Upon receiving the input to continue to the launch location 63, the process 300 continues in a block 345.

In the block 345, the computer 34 starts to guide the vehicle 12 to back the trailer 14 into the launch location 63. The process 300 continues in a block 350.

In the block 350, the computer 34 continues to guide the vehicle 12 to back the trailer 14 into the launch location 63. As the trailer 14 is enters the launch location 63, the computer 34 monitors, based on data from data collectors 30, 40, a depth of the water at a position on the trailer 14.

For example, sensor 40, attached to the trailer 14 at the position, may detect when the sensor 40 comes into contact with, or is submersed in water. As another example, a data collector 30, 40 such as radar, LiDAR or a camera may collect data that may be used to determine the depth of water at the position on the trailer.

The computer 34 may continue to monitor the data until the computer 34 determines that the depth of the water at the position on the trailer 14 is greater than a predetermined threshold. Upon determining that the depth is greater than the predetermined threshold, the process continues in a block 355.

In the block 355, the computer 34 halts the vehicle 12. The trailer 14 is in a position to launch the boat 15. Upon halting the vehicle 12, the process 300 continues in a block 360.

In the block 360, the vehicle 12 computer 34 receives an input to park the vehicle 12 together with the trailer 14. For example, after launching the boat, the user may, via the boat 15 HMI 49, the mobile device 16 HMI 52 or the vehicle 12 HMI 32, provide input to the vehicle 12 computer 34 to park the vehicle 12. Upon receiving the input to park the vehicle 12, the process 300 continues in a block 365.

In the block 355, the computer 34 parks the vehicle 12 using known autonomous vehicle control mechanisms. Upon parking the vehicle 12, the process 300 ends.

Figure 4:
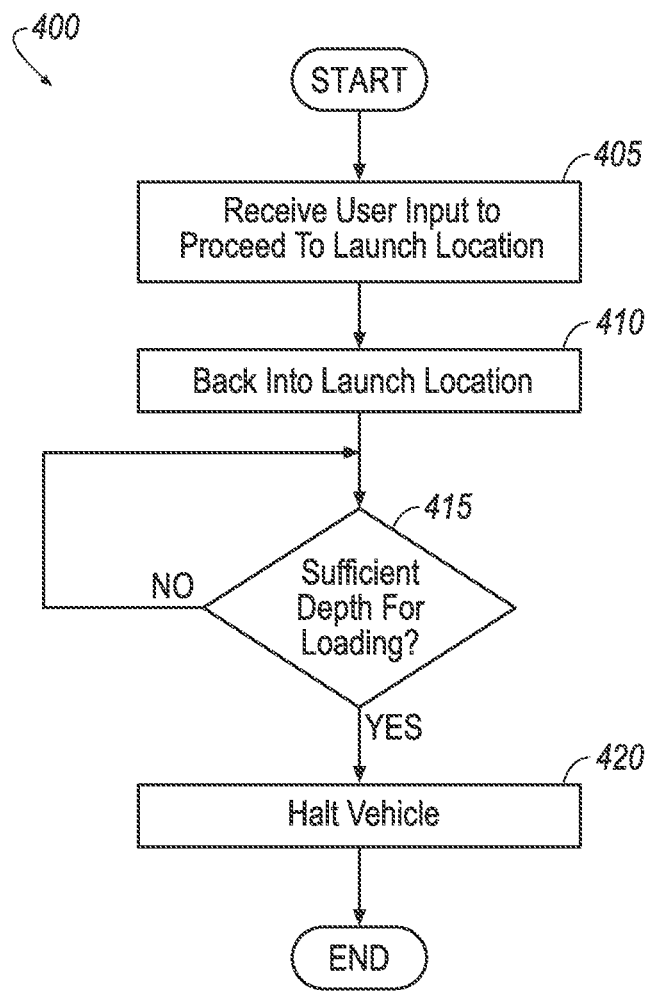
FIG. 4 is a diagram of an exemplary process for loading a boat by an autonomous vehicle.

FIG. 4 is a diagram for an exemplary process 400 for loading the boat 15. The process 400 starts in a block 405.

In the block 405, the vehicle 12 computer 34 receives an instruction to proceed to a launch location. In some cases, the instruction may be an instruction to return to the previous launch location 63. In other cases, the instruction may specify a different launch location 63 for loading the boat 15, or request a GUI 60 that allows the user to select a launch location 63. The user may then select a launch location for loading the boat via the GUI 60.

As an example, the user may, via the mobile device 16 computer 54 or boat 15 computer 47 transmit a message to the vehicle 12 computer 34. The message may indicate that the user wishes to load the boat 15 and request that the vehicle 12 computer 34 provide a GUI 60 to select a launch location 63 for the loading operation.

Based on the message, the vehicle 12 computer 34 may supply the GUI 60 to one of the boat 15 computer 47 and the mobile device 16 computer 54. The boat 15 computer 47 or mobile device 16 computer 54 may then present the GUI 60 to the user via respectively the boat 15 HMI 49 or the mobile device 16 HMI 52.

The user may use the GUI 60 to select a launch location 63 for loading the boat 15. As an example, the user may drag the pin 66 (FIG. 2B) to select the launch location 63 for the boat loading operation.

As another example, the message sent to the vehicle 12 computer 34 may indicate that the user wishes to be picked up at the launch location 63 nearest to the boat 15. The vehicle 12 computer 34 may collect global positioning data indicating a position of the boat 15. The data may be collected, for example, from the mobile device 16 computer 54 or the boat 15 computer 47.

Based on the global positioning coordinates of the boat 15, the vehicle 12 computer 34 may determine a launch location 63 that is closest to the boat 15. In this case, the vehicle 12 computer 34 may send a GUI 60 to one of the boat 15 computer 47 and the mobile device 16 computer 54 indicating the selected launch location 63.

Upon receiving the instruction to proceed to a launch location 63, and when necessary, determining the launch location 63 to use to load the boat, the process 400 continues in a block 410.

In the block 410, the computer 34 guides the vehicle 12 to back the trailer 14 into the selected launch location 63, according to the process described with regard to the block 345. When the computer 34 has guided the trailer 14 into the launch location, the process 400 continues in a block 415.

In the block 415, the computer 34 receives an input from the user, via one of the vehicle 12 HMI 32, the boat 15 HMI 49 and the mobile device 16 HMI 52 indicating that the vehicle 12 can proceed to a next destination. The computer 34 guides the vehicle 12 based on normal autonomous vehicle control mechanisms as is known. The process 400 then ends.

CONCLUSION

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A computing device for a vehicle including a processor and a memory, the memory storing instructions executable by the processor such that the processor is programmed to:
   determine that a vehicle destination includes a boat launch and that the vehicle is towing a trailer including a boat; and
   guide the vehicle at the boat launch, to position the trailer to launch the boat.

2. The computing device of claim 1, wherein the processor is further programmed to:
   receive, via a human-machine interface, a selection of a first launch location within the boat launch.

3. The computing device of claim 2, wherein the processor is further programmed to:
   identify a parking area proximate to the boat launch and park the vehicle in the parking area.

4. The computing device of claim 2, wherein the processor is further programmed to:
   receive a first instruction to back the trailer into the first launch location, and
   back the trailer into the first launch location.

5. The computing device of claim 4, wherein the processor is further programmed to:
   determine, based on sensed data, that a water depth for a section of the trailer is greater than a predetermined threshold at a first position of the trailer relative to the first launch location; and
   halt the trailer at the first position relative to the first launch location.

6. The computing device of claim 5, wherein the processor is further programmed to:
   receive an instruction for the vehicle to park; and
   park the vehicle in the parking area.

7. The computing device of claim 6, wherein the processor is further programmed to:
   receive an instruction to back the trailer into a second launch location; and
   back the boat trailer into the second launch location.

8. The computing device of claim 7, wherein the instruction to back the trailer into the second launch location is received from a second computing device.

9. The computing device of claim 8, wherein, the processor is programmed to:
   receive, prior to receiving the instruction to back the boat trailer into the second launch location, a request to transmit a graphical user interface to the second computing device; and
   transmit, to the second computing device, the graphical user interface.

10. A computing device for a vehicle including a processor and a memory, the memory storing instructions executable by the processor such that the processor is programmed to:
    receive a first instruction to back a trailer into a first launch location;
    back the trailer into the first launch location;
    determine, based on sensed data, that a water depth is greater than a predetermined threshold; and
    halt the trailer based on the determination.

11. The computing device of claim 10, further programmed to:
    receive a second instruction for the vehicle to park; and
    park the vehicle in a parking area.

12. The computing device of claim 11, further programmed to:
    receive a third instruction to back the trailer into a second launch location; and
    back the boat trailer into the second launch location.

13. The computing device of claim 12, further programmed to:
    receive, prior to receiving the third instruction to back the boat trailer into the second launch location, a request to transmit a graphical user interface to a second computing device; and
    transmit the graphical user interface to the second computing device.

14. The computing device of claim 10, wherein the processor is further programmed to:
   receive, prior to receiving the first instruction to back the trailer into the first launch location, a destination for the vehicle;
   determine that the vehicle destination includes the a boat launch including the first launch location and that the vehicle is towing a trailer including a boat; and
   guide the vehicle at the boat launch, to position the trailer to launch the boat.

15. The computing device of claim 14, wherein the processor is further programmed to:
   receive, via a human-machine interface, a selection of the first launch location within the boat launch.

16. A method, comprising:
   determining, by a computer in a vehicle, that a vehicle destination includes a boat launch and that the vehicle is towing a trailer including a boat; and
   guiding the vehicle at the boat launch, to position the trailer to launch the boat.

17. The method of claim 16, further comprising:
   receiving, via a human-machine interface, a selection of a first launch location within the boat launch.

18. The method of claim 17, further comprising:
   identifying a parking area proximate to the boat launch and
   parking the vehicle in the parking area.

19. The method of claim 17, further comprising:
   receiving a first instruction to back the trailer into the first launch location, and
   backing the trailer into the first launch location.

20. The method of claim 19, further comprising:
   determining, based on sensed data, that a water depth for a section of the trailer is greater than a predetermined threshold at a first position of the trailer relative to the first launch location; and
   halting the trailer at the first position relative to the first launch location.

* * * * *